US012808014B2

(12) United States Patent
Park et al.

(10) Patent No.: US 12,808,014 B2
(45) Date of Patent: Nov. 24, 2026

(54) GRAIN-ORIENTED ELECTRICAL STEEL SHEET AND METHOD FOR REFINING MAGNETIC DOMAIN THEREOF

(71) Applicant: POSCO, Pohang-si (KR)

(72) Inventors: Se-Min Park, Pohang-si (KR); Chang-Ho Kim, Pohang-si (KR); Ki-Young Min, Pohang-si (KR)

(73) Assignee: POSCO, Pohang-si (KR)

( * ) Notice: Subject to any disclaimer, the term of this patent is extended or adjusted under 35 U.S.C. 154(b) by 1087 days.

(21) Appl. No.: 17/785,703

(22) PCT Filed: Dec. 9, 2020

(86) PCT No.: PCT/KR2020/017973
§ 371 (c)(1),
(2) Date: Jun. 15, 2022

(87) PCT Pub. No.: WO2021/125680
PCT Pub. Date: Jun. 24, 2021

(65) Prior Publication Data

US 2023/0060058 A1 Feb. 23, 2023

(30) Foreign Application Priority Data

Dec. 19, 2019 (KR) ........................ 10-2019-0171286

(51) Int. Cl.
*C21D 10/00* (2006.01)
*C21D 8/12* (2026.01)
(Continued)

(52) U.S. Cl.
CPC ......... *C21D 10/005* (2013.01); *C21D 8/1283* (2013.01); *C21D 8/1294* (2013.01);
(Continued)

(58) Field of Classification Search
None
See application file for complete search history.

(56) References Cited

U.S. PATENT DOCUMENTS

2013/0130043 A1 5/2013 Omura et al.

FOREIGN PATENT DOCUMENTS

CN 1114687 A 1/1996
CN 105339510 A 2/2016
(Continued)

OTHER PUBLICATIONS

Office Action and Search Report issued in Chinese Patent Application No. 202080087093.X dated Mar. 16, 2023.
(Continued)

*Primary Examiner* — Anthony M Liang
(74) *Attorney, Agent, or Firm* — Morgan Lewis & Bockius LLP

(57) ABSTRACT

A grain-oriented electrical steel sheet according to an exemplary embodiment of the present invention includes: a linear groove formed in one or both surfaces of the electrical steel sheet in a direction intersecting with a rolling direction; and a linear thermal shock portion formed in the one or both surfaces of the electrical steel sheet in a direction intersecting with the rolling direction. An angle between a longitudinal direction of the groove and a longitudinal direction of the thermal shock portion is 1 to 5°.

12 Claims, 6 Drawing Sheets

(51) Int. Cl.

| | |
|---|---|
| ***C21D 8/1277*** | (2026.01) |
| ***C21D 8/1294*** | (2026.01) |
| ***C21D 9/46*** | (2006.01) |
| ***H01F 1/16*** | (2006.01) |
| ***H01F 41/02*** | (2006.01) |

(52) U.S. Cl.

CPC ................. *C21D 9/46* (2013.01); *H01F 1/16* (2013.01); *H01F 41/02* (2013.01); *C21D 2201/05* (2013.01)

(56) References Cited

FOREIGN PATENT DOCUMENTS

| | | | | | |
|---|---|---|---|---|---|
| CN | 106029917 | A | | 10/2016 | |
| CN | 110088308 | A | | 8/2019 | |
| EP | 870843 | A1 | * | 10/1998 | ........... C21D 8/1294 |
| EP | 3561087 | A1 | | 10/2019 | |
| JP | S53-137016 | A | | 11/1978 | |
| JP | S55-018566 | A | | 2/1980 | |
| JP | S62-096617 | A | | 5/1987 | |
| JP | S63-042332 | A | | 2/1988 | |
| JP | H05-202450 | A | | 8/1993 | |
| JP | 07320922 | A | * | 12/1995 | ............... C21D 7/04 |
| JP | H07-320922 | A | | 12/1995 | |
| JP | 2005-248291 | A | | 9/2005 | |
| JP | 4319715 | B2 | | 8/2009 | |
| JP | 2012-012639 | A | | 1/2012 | |
| JP | 2019-157152 | A | | 9/2019 | |
| KR | 10-0259990 | B1 | | 6/2000 | |
| KR | 10-2013-0128214 | A | | 11/2013 | |
| KR | 10-2016-0078247 | A | | 7/2016 | |
| KR | 10-2018-0073306 | A | | 7/2018 | |
| KR | 10-2019-0078161 | A | | 7/2019 | |
| KR | 10-2020-0024658 | A | | 3/2020 | |
| WO | 2019/132360 | A1 | | 7/2019 | |

OTHER PUBLICATIONS

Extended European Search Report dated Apr. 25, 2023 issued in European Patent Application No. 20904175.5.

Japanese Office Action dated Aug. 1, 2023 issued in Japanese Patent Application No. 2022-538351.

International Search Report dated May 10, 2021 issued in International Patent Application No. PCT/KR2020/017973 (with English translation).

* cited by examiner

GRAIN-ORIENTED ELECTRICAL STEEL SHEET AND METHOD FOR REFINING MAGNETIC DOMAIN THEREOF

CROSS-REFERENCE OF RELATED APPLICATIONS

This application is the U.S. National Phase under 35 U.S.C. § 371 of International Patent Application No. PCT/KR2020/017973, filed on Dec. 9, 2020, which in turn claims the benefit of Korean Application No. 10-2019-0171286, filed on Dec. 19, 2019, the entire disclosures of which applications are incorporated by reference herein.

TECHNICAL FIELD

The present invention relates to a grain-oriented electrical steel sheet and a method for refining a magnetic domain thereof. More specifically, the present invention relates to a grain-oriented electrical steel sheet that may reduce an iron loss and may also reduce a thermal shock amount by combining a permanent magnetic domain refining method and a temporary magnetic domain refining method, and a method for refining a magnetic domain thereof.

BACKGROUND ART

Since a grain-oriented electrical steel sheet is used as an iron core material of an electrical device such as a transformer, in order to improve energy conversion efficiency by reducing a power loss of the device, a steel sheet having an excellent iron loss of the iron core material and a high occupying ratio when being stacked and coiled is required.

The grain-oriented electrical steel sheet refers to a functional steel sheet having a texture (also referred to as a "Goss texture") in which a secondarily recrystallized grain is oriented in a {110}<001> direction in a rolling direction through hot-rolling, cold-rolling, and annealing processes.

As a method of reducing the iron loss of the grain-oriented electrical steel sheet, a magnetic domain refining method is known. That is, it is a method for refining a large magnetic domain contained in a grain-oriented electrical steel sheet by scratching or energizing the magnetic domain. In this case, when the magnetic domain is magnetized and a direction thereof is changed, energy consumption may be reduced more than when the magnetic domain is large. The magnetic domain refining method includes a permanent magnetic domain refining method by which an improvement effect is maintained even after heat treatment and a temporary magnetic domain refining method by which an improvement effect is not maintained even after heat treatment.

The permanent magnetic domain refining method by which the iron loss is reduced even after stress relaxation heat treatment at a heat treatment temperature or higher at which recovery occurs may be classified into an etching method, a roll method, and a laser method. In the case of the etching method, since a groove is formed in a surface of a steel sheet through a selective electrochemical reaction in a solution, it is difficult to control a shape of the groove, and it is difficult to uniformly secure iron loss characteristics of a final product in a width direction. In addition, the etching method has a disadvantage that it is not environmentally friendly due to an acid solution used as a solvent.

The permanent magnetic domain refining method using a roll is a magnetic domain refining technology that provides an effect of reducing an iron loss that partially causes recrystallization at a bottom of a groove by forming the groove having a certain width and depth in a surface of a plate by processing a protrusion shape on the roll and pressing the roll or plate, and then performing annealing. The roll method is disadvantageous in stability in machine processing, in reliability due to difficulty in securing a stable iron loss depending on a thickness, in process complexity, and in deterioration of the iron loss and magnetic flux density characteristics immediately after the groove formation (before stress relaxation annealing).

The permanent magnetic domain refining method using a laser is a method in which a surface portion of an electrical steel sheet moving at a high speed is irradiated with a laser having a high output, and a groove accompanied by melting of a base portion is formed by irradiation with a laser. However, these permanent magnetic domain refining methods also have difficulty in refining the magnetic domain to a minimum size.

A current technology of the temporary domain refining method is focused on not performing coating once again after applying the laser in a coated state, and thus, the laser is not irradiated at an intensity higher than a predetermined level. This is because when the laser is irradiated at an intensity higher than a predetermined level, it is difficult to properly exhibit a tension effect due to damage to the coating.

Since the permanent magnetic domain refining method is to increase a free charge area that may receive static magnetic energy by forming a groove, a deep groove depth is required as much as possible. In addition, a side effect such as a decrease in magnetic flux density also occurs due to the deep groove depth. Therefore, in order to reduce the magnetic flux density deterioration, the groove is managed with an appropriate groove depth.

DISCLOSURE

Technical Problem

The present invention has been made in an effort to provide a grain-oriented electrical steel sheet and a method for refining a magnetic domain thereof. Specifically, the present invention has been made in an effort to provide a grain-oriented electrical steel sheet that may reduce an iron loss and may also reduce a thermal shock amount by combining a permanent magnetic domain refining method and a temporary magnetic domain refining method, and a method for refining a magnetic domain thereof.

Technical Solution

According to an exemplary embodiment of the present invention, a grain-oriented electrical steel sheet includes: a linear groove formed in one or both surfaces of the electrical steel sheet in a direction intersecting with a rolling direction; and a linear thermal shock portion formed in the one or both surfaces of the electrical steel sheet in a direction intersecting with the rolling direction.

An angle between a longitudinal direction of the groove and a longitudinal direction of the thermal shock portion is 1 to 5°.

A plurality of grooves and a plurality of thermal shock portions may be formed in the rolling direction, and a ratio D2/D1 of a distance D2 between the thermal shock portions to a distance D1 between the grooves may be 1.7 to 2.3.

The ratio D2/D1 of the distance D2 between the thermal shock portions to the distance D1 between the grooves may be 1.7 to 1.9 or 2.1 to 2.3.

A distance D1 between the grooves may be 2.0 to 3.0 mm, and a distance D2 between the thermal shock portions may be 4.0 to 6.0 mm.

The groove and the thermal shock portion may be formed in one surface of the steel sheet.

The groove may be formed in one surface of the steel sheet, and the thermal shock portion may be formed in the other surface of the steel sheet.

A depth of the groove may be 3 to 5% of a thickness of the steel sheet.

A difference in Vickers hardness Hv between the thermal shock portion and a surface of the steel sheet in which the thermal shock portion is not formed may be 10 to 120.

The grain-oriented electrical steel sheet may further include a solidified alloy layer formed at a bottom of the groove, and a thickness of the solidified alloy layer may be 0.1 μm to 3 μm.

The grain-oriented electrical steel sheet may further include an insulating coating film formed on an upper portion of the groove.

Each of the longitudinal directions of the groove and the thermal shock portion and the rolling direction may form an angle of 75 to 88°.

Two to ten grooves or thermal shock portions may be intermittently formed in a rolling vertical direction of the steel sheet.

According to another exemplary embodiment of the present invention, a method for refining a magnetic domain of a grain-oriented electrical steel sheet includes: preparing a grain-oriented electrical steel sheet; forming a linear groove by irradiating one or both surfaces of the grain-oriented electrical steel sheet with a laser in a direction intersecting with a rolling direction; and forming a linear thermal shock portion by irradiating the one or both surfaces of the grain-oriented electrical steel sheet with a laser in a direction intersecting with the rolling direction.

An angle between a longitudinal direction of the groove and a longitudinal direction of the thermal shock portion is 1 to 5°.

The forming of the groove and the forming of the thermal shock portion may be performed a plurality of times so that a plurality of grooves and a plurality of thermal shock portions are formed in the rolling direction, and a ratio D2/D1 of a distance D2 between the thermal shock portions to a distance D1 between the grooves is 1.7 to 2.3.

In the forming of the groove, an energy density of the laser may be 0.5 to 2 $J/mm^2$, and in the forming of the thermal shock portion, an energy density of the laser may be 0.02 to 0.2 $J/mm^2$.

In the forming of the groove, a beam length of the laser in a rolling vertical direction of the steel sheet may be 50 to 750 μm, and a beam width of the laser in the rolling direction of the steel sheet may be 10 to 30 μm.

In the forming of the thermal shock portion, a beam length of the laser in a rolling vertical direction of the steel sheet may be 1,000 to 15,000 μm, and a beam width of the laser in the rolling direction of the steel sheet may be 80 to 300 μm.

The method for refining a magnetic domain of a grain-oriented electrical steel sheet may further include forming an insulating coating film on a surface of the steel sheet.

After the forming of the groove, the forming of the insulating coating film on the surface of the steel sheet may be performed.

After the forming of the insulating coating film on the surface of the steel sheet, the forming of the thermal shock portion may be performed.

Advantageous Effects

As set forth above, in an exemplary embodiment of the present invention, the iron loss may be reduced and the thermal shock amount may also be reduced by combining a permanent magnetic domain refining method and a temporary magnetic domain refining method.

MODE FOR INVENTION

The terms "first", "second", "third", and the like are used to describe various parts, components, regions, layers, and/or sections, but are not limited thereto. These terms are only used to differentiate a specific part, component, region, layer, or section from another part, component, region, layer, or section. Accordingly, a first part, component, region, layer, or section which will be described hereinafter may be referred to as a second part, component, region, layer, or section without departing from the scope of the present invention.

Terminologies used herein are to mention only a specific exemplary embodiment, and are not to limit the present invention. Singular forms used herein include plural forms as long as phrases do not clearly indicate an opposite meaning. The term "comprising" used in the present specification concretely indicates specific properties, regions, integers, steps, operations, elements, and/or components, and is not to exclude the presence or addition of other specific properties, regions, integers, steps, operations, elements, and/or components.

When any part is positioned "on" or "above" another part, it means that the part may be directly on or above the other part or another part may be interposed therebetween. In contrast, when any part is positioned "directly on" another part, it means that there is no part interposed therebetween.

Unless defined otherwise, all terms including technical terms and scientific terms used herein have the same meanings as understood by those skilled in the art to which the present invention pertains. Terms defined in a generally used dictionary are additionally interpreted as having the meaning matched to the related technical document and the currently disclosed contents and are not interpreted as ideal or very formal meanings unless otherwise defined.

Hereinafter, exemplary embodiments of the present invention will be described in detail so that those skilled in the art to which the present invention pertains may easily practice the present invention. However, the present invention may be implemented in various different forms and is not limited to exemplary embodiments described herein.

Figure 1:
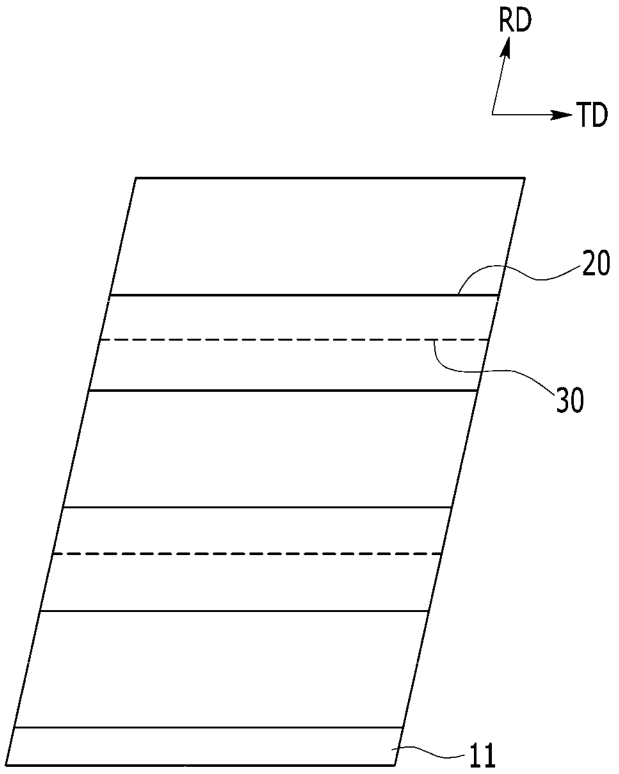
FIG. 1 is a schematic view of a rolled plane (ND plane) of a grain-oriented electrical steel sheet according to an exemplary embodiment of the present invention.
Figure 2:
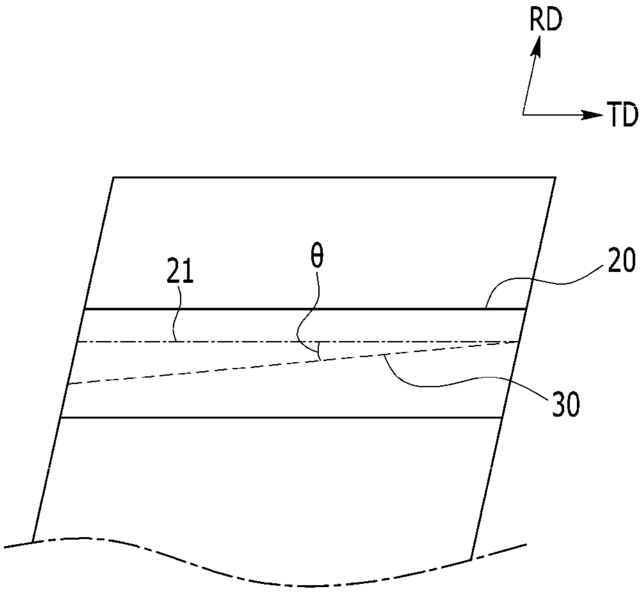
FIG. 2 is a schematic view of a rolled plane (ND plane) of a grain-oriented electrical steel sheet according to an exemplary embodiment of the present invention.

FIGS. 1 and 2 illustrate schematic views of a grain-oriented electrical steel sheet 10 in which a magnetic domain is refined by an exemplary embodiment of the present invention.

As illustrated in FIGS. 1 and 2, the grain-oriented electrical steel sheet 10 according to an exemplary embodiment of the present invention includes: a linear groove 20 formed in one surface 11 or both surfaces 11 and 12 of the electrical steel sheet in a direction intersecting with a rolling direction (RD); and a linear thermal shock portion 30 formed in the one surface 11 or the both surfaces 11 and 12 of the electrical steel sheet in a direction intersecting with the rolling direction.

An angle between a longitudinal direction of the groove 20 and a longitudinal direction of the thermal shock portion 30 may be 1 to 5°.

According to an exemplary embodiment of the present invention, the groove 20 and the thermal shock portion 30 are simultaneously formed, such that the magnetic domain may be refined to a minimum size, and as a result, an iron loss may be reduced. When the groove 20 is formed with a laser, energy that is strong enough to generate iron powder is focused, and thus, a temperature in the vicinity thereof is significantly increased. When the laser for forming the thermal shock portion 30 is irradiated in the vicinity thereof, a peripheral portion of the groove 20 receives heat, and heat shrinkage occurs during cooling. Tensile stress acts on the steel sheet 10 due to the heat shrinkage. As a result, the tensile stress reduces a size of a magnetic domain. In addition, a free surface formed by the formation of the groove 20 generates a static magnetic energy surface charge to form a closed curve, two effects by different mechanisms are simultaneously formed, and the iron loss is further reduced due to synergy of the two effects.

In particular, a thermal shock caused by formation of a large number of the thermal shock portions 30 may be reduced by forming the groove 20, and damage to an insulating coating film 50 may be prevented by forming the thermal shock portion 30, such that it is possible to maximize corrosion resistance.

In particular, when the groove 20 is formed alone, a region inefficient for an iron loss is present around the groove 20 due to a proper grain size and an internal magnetic domain formation shape. However, in an exemplary embodiment of the present invention, the thermal shock portion 30 is also formed, such that a reduction in iron loss is supplemented.

As illustrated in FIG. 2, an angle θ is formed between the longitudinal direction of the groove 20 and the longitudinal direction of the thermal shock portion 30, and a range of the angle is 1 to 5°.

The groove 20 and the thermal shock portion 30 may or may not intersect with each other. In a case where the groove 20 and the thermal shock portion 30 intersect with each other, an angle at an intersection point is 1 to 5°. In a case where the groove 20 and the thermal shock portion 30 do not intersect with each other, an angle at an intersection point of an imaginary line 21 obtained by moving the groove 20 in parallel in the rolling direction (RD) and the thermal shock portion 30 may be 1 to 5°.

In a case where the angle θ between the longitudinal direction of the groove 20 and the longitudinal direction of the thermal shock portion 30 is too small, that is, in a case where the groove 20 and the thermal shock portion 30 are closed to parallel, an angular distribution of a texture of the steel sheet is distributed within ±5°, and thus, the entire range may not be covered, such that the iron loss may be deteriorated. In a case where the angle θ between the longitudinal direction of the groove 20 and the longitudinal direction of the thermal shock portion 30 is too large, the angular distribution of the texture of the steel sheet is exceeded, a magnetic domain disadvantageous for the iron loss is rather formed around a laser line, such that the iron loss may be deteriorated. More specifically, the angle between the longitudinal direction of the groove 20 and the longitudinal direction of the thermal shock portion 30 may be 1 to 3°.

Figure 3:
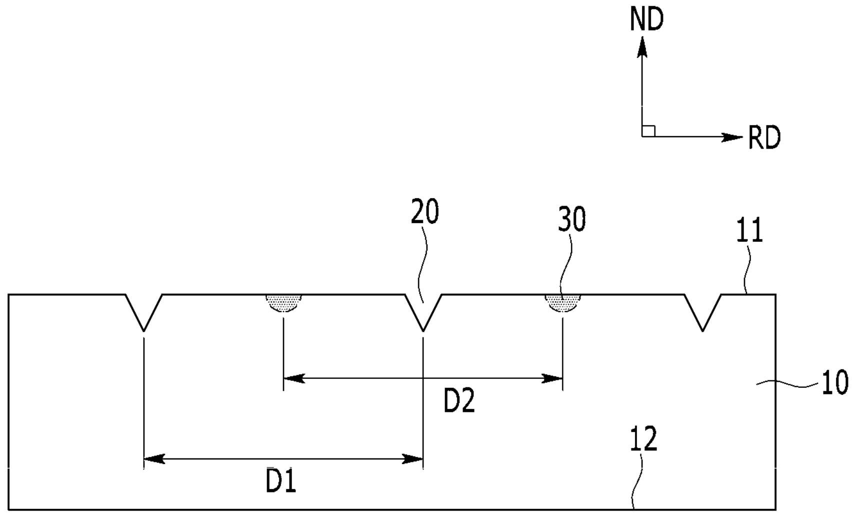
FIG. 3 is a schematic view of a cross section (TD plane) of a grain-oriented electrical steel sheet according to an exemplary embodiment of the present invention.

FIG. 3 illustrates a schematic view of a cross section (TD plane) of a grain-oriented electrical steel sheet according to an exemplary embodiment of the present invention.

In FIG. 3, a distance between the grooves 20 is indicated by D1 and a distance between the thermal shock portions 30 is indicated by D2.

As illustrated in FIG. 3, in a case where a plurality of grooves 20 and a plurality of thermal shock portions 30 are formed, a distance between an arbitrary groove 20 and a groove 20 located closest to the arbitrary groove 20 is defined as the distance D1 between the grooves. In addition, a distance between an arbitrary thermal shock portion 30 and a thermal shock portion 30 located closest to the arbitrary thermal shock portion 30 is defined as the distance D2 between the thermal shock portions.

In addition, in an exemplary embodiment of the present invention, since the groove 20 and the thermal shock portion 30 have a thickness in the rolling direction (RD), the distance is defined based on the centerline of the groove 20 and the centerline of the thermal shock portion 30. In addition, in a case where the plurality of grooves 20 and the plurality of thermal shock portions 30 are formed, an average value of the distances D1 and D2, that is, a value obtained by dividing the sum of the distances D1 and D2 by the total number may satisfy the range described above.

A ratio D2/D1 of the distance D2 between the thermal shock portions to the distance D1 between the grooves may be 1.7 to 2.3.

Figure 4:
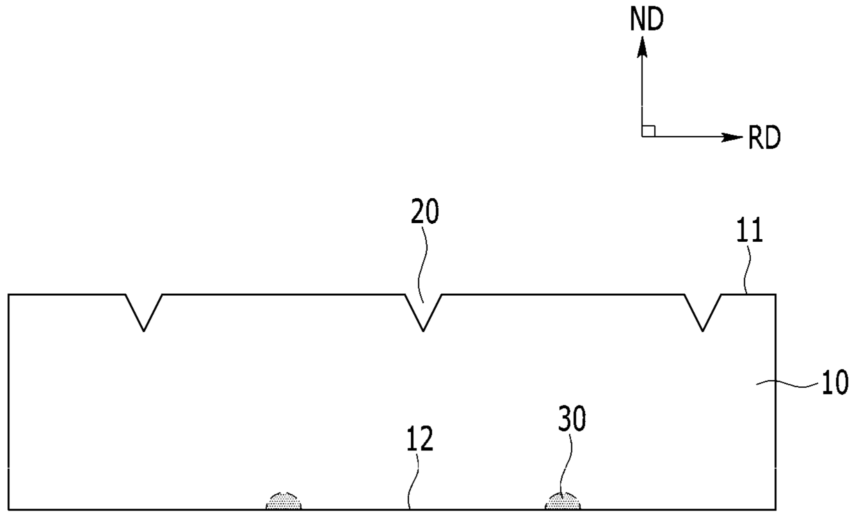
FIG. 4 is a schematic view of a cross section (TD plane) of a grain-oriented electrical steel sheet according to another exemplary embodiment of the present invention.

In FIGS. 3 and 4, an example in which D2/D1 is about 1 is described, but this is for explaining the definitions of D1 and D2, and the ratio may be 1.7 to 2.3. The effect of reducing the iron loss may be maximized by maximizing a density of spike domains formed within a unit area. When D2/D1 is too small, the effect of reducing the iron loss may not be secured in spite of the ease of magnetic domain movement due to the formation of the spike domain. When D2/D1 is too large, rather than the intended effect of further reducing the iron loss, a domain (the spike domain that may move the domain smoothly is not formed) that is not suitable is formed, which may be a factor inhibiting a reduction in iron loss. More specifically, the ratio D2/D1 of the distance D2 between the thermal shock portions 30 to the distance D1 between the grooves 20 may be 1.7 to 1.9 or 2.1 to 2.3. When the ratio D2/D1 is 2.0, the distances proportionately perfectly coincide with each other, and the highest point of the thermal shock portion 30 coincides with the lowest point of the groove 20. Due to the formation of the groove 20, thermal shock that is too strong is applied to the lowest point of the groove 20 where formation of a base coating or the like is insufficient, and cracks or deterioration at the point may occur. Therefore, the laser may be applied so that the ratio D2/D1 is not an integer multiple.

More specifically, the distance D1 between the grooves 20 may be 2.0 to 3.0 mm, and the distance D2 between the thermal shock portions 30 may be 4.0 to 6.0 mm. Still more specifically, the distance D1 between the grooves 20 may be 2.2 to 2.7 mm, and the distance D2 between the thermal shock portions 30 may be 4.2 to 5.7 mm.

When the distances D1 and D2 are too large, rather than the intended effect of further reducing the iron loss, a spike domain that may smoothly move the magnetic domain is not formed, which may be a factor inhibiting the reduction in iron loss. When the distances D1 and D2 are too small, in spite of the ease of the movement of the magnetic domain due to the formation of the spike domain, a heat-affected zone by the irradiation with a laser is too large, such that the effect of reducing the iron loss may not be secured.

The distance D1 between the grooves and the distance D2 between the thermal shock portions may be constant within the entire electrical steel sheet. Specifically, all of the distances D1 between the grooves and the distances D2 between the thermal shock portions within the entire electrical steel sheet may be within 10% of an average distance D1 between the grooves and an average distance D2 between the thermal shock portions. More specifically, it may be within 1%.

FIG. 3 illustrates that the groove 20 and the thermal shock portion 30 are formed in one surface 11, but the present invention is not limited thereto. For example, as illustrated in FIG. 4, the groove 20 may be formed in one surface 11 of the steel sheet, and the thermal shock portion 30 may be formed in the other surface 12 of the steel sheet. Since it is the same as that described in an exemplary embodiment of the present invention except for forming the thermal shock portion 30 in the other surface 12, an overlapping description will be omitted.

As illustrated in FIGS. 3 and 4, the groove 20 refers to a portion obtained by removing a part of the surface of the steel sheet by the irradiation with a laser. In FIGS. 3 and 4, a shape of the groove 20 is illustrated as a wedge shape, but it is merely an example, and the groove may be formed in various shapes such as a square shape, a trapezoidal shape, a U-shape, a semi-circular shape, and a W shape.

Figure 5:
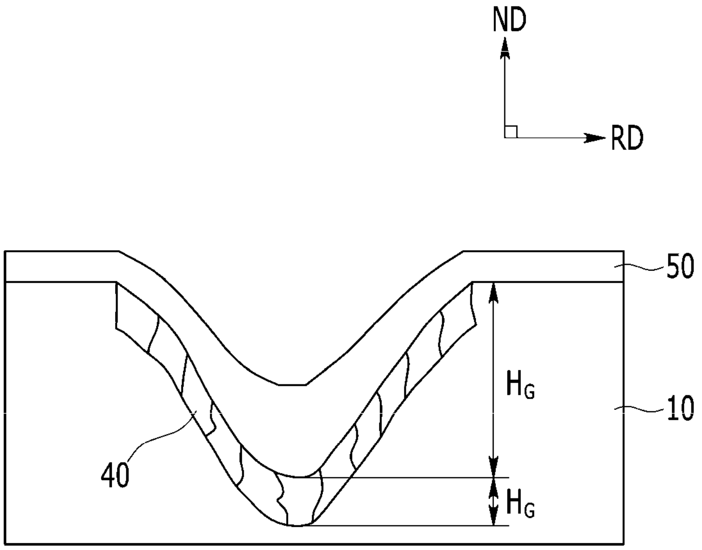
FIG. 5 is a schematic view of a groove according to an exemplary embodiment of the present invention.

FIG. 5 illustrates a schematic view of the groove 20 according to an exemplary embodiment of the present invention. A depth $H_G$ of the groove 20 may be 3 to 5% of a thickness of the steel sheet. When the depth $H_G$ of the groove is too small, it is difficult to obtain an appropriate effect of reducing the iron loss. When the depth $H_G$ of the groove is too large, structure characteristics of the steel sheet 10 may be significantly changed due to strong irradiation with a laser, or a large amount of hill-up and spatter are formed, which may cause deterioration of magnetic properties. Therefore, the depth of the groove 20 may be controlled within the range described above.

As illustrated in FIG. 5, the grain-oriented electrical steel sheet may include a solidified alloy layer 40 formed at a bottom of the groove 20, and a thickness of the solidified alloy layer 40 may be 0.1 μm to 3 μm. By appropriately controlling the thickness of the solidified alloy layer 40, only the spike domain is formed in the groove after final insulating coating without affecting the formation of secondary recrystallization. When the thickness of the solidified alloy layer 40 is too large, it affects recrystallization during primary recrystallization, and thus, a Goss intensity in the secondary recrystallization after secondary recrystallization annealing is deteriorated, such that the effect of reducing the iron loss may not be secured even when the secondarily recrystallized steel sheet is irradiated with a laser. The solidified alloy layer contains recrystallized grains having an average grain diameter of 1 to 10 μm and is distinguished from other portions of the steel sheet.

As illustrated in FIG. 5, the insulating coating film 50 may be formed on an upper portion of the groove 20.

FIGS. 1 and 2 illustrate that each of the longitudinal directions of the groove 20 and the thermal shock portion 30 and the rolling direction (RD) form a right angle, but the present invention is not limited thereto. For example, each of the longitudinal directions of the groove 20 and the thermal shock portion 30 and the rolling direction may form an angle of 75 to 88°. When the angle described above is formed, it may contribute to reducing the iron loss of the grain-oriented electrical steel sheet.

FIGS. 1 and 2 illustrate that the grooves 20 and the thermal shock portions 30 are continuously formed in the rolling vertical direction (transverse direction (TD)), but the present invention is not limited thereto. For example, two to ten grooves 20 or thermal shock portions 30 may be intermittently formed in the rolling vertical direction (TD) of the steel sheet. When the grooves and the thermal shock portions are intermittently formed as described above, it may contribute to reducing the iron loss of the grain-oriented electrical steel sheet.

Unlike the groove 20, the thermal shock portion 30 is not apparently distinguished from other surfaces of the steel sheet. The thermal shock portion 30 is a portion that is etched in a form of a groove when immersed in hydrochloric acid at a concentration of 5% or more for 10 minutes or longer, and may be distinguished from other surface portions of the steel sheet. Alternatively, the thermal shock portion 30 may be distinguished in that a difference in Vickers hardness Hv between the thermal shock portion 30 and a surface of the steel sheet in which the groove 20 or the thermal shock portion 30 is not formed is 10 to 120. In this case, as a method of measuring the hardness, a hardness of the thermal shock portion and a hardness of a portion to which thermal shock is not applied may be measured by a nanoindenter at a microhardness. That is, the hardness refers to a Vickers nanohardness Hv.

A method for refining a magnetic domain of a grain-oriented electrical steel sheet according to an exemplary embodiment of the present invention includes: preparing a grain-oriented electrical steel sheet 10; forming a groove 20 by irradiating one or both surfaces of the grain-oriented electrical steel sheet 10 with a laser in a direction intersecting with a rolling direction (RD); and forming a thermal shock portion 30 by irradiating the one or both surfaces of the grain-oriented electrical steel sheet 10 with a laser in a direction intersecting with the rolling direction (RD).

First, the grain-oriented electrical steel sheet 10 is prepared. An exemplary embodiment of the present invention is characterized by the magnetic domain refining method and shapes of the groove 20 and the thermal shock portion 30 to be formed, and the grain-oriented electrical steel sheet for the magnetic domain refining may be used without limitation. In particular, the effects of the present invention are exhibited regardless of an alloy composition of the grain-oriented electrical steel sheet. Therefore, a detailed description of the alloy composition of the grain-oriented electrical steel sheet will be omitted.

In an exemplary embodiment of the present invention, as the grain-oriented electrical steel sheet, a grain-oriented electrical steel sheet rolled to a predetermined thickness through hot-rolling and cold-rolling of a slab may be used.

Next, one surface 11 of the grain-oriented electrical steel sheet is irradiated with a laser in a direction intersecting with the rolling direction (RD) to form the groove 20.

In this case, an energy density Ed of the laser may be 0.5 to 2 J/mm$^2$. When the energy density is too low, the groove 20 having an appropriate depth is not formed, and the effect of reducing the iron loss may not be obtained. On the contrary, even when the energy density is too high, the groove 20 having a depth that is too large is formed, such that the effect of reducing the iron loss may not be obtained.

Figure 6:
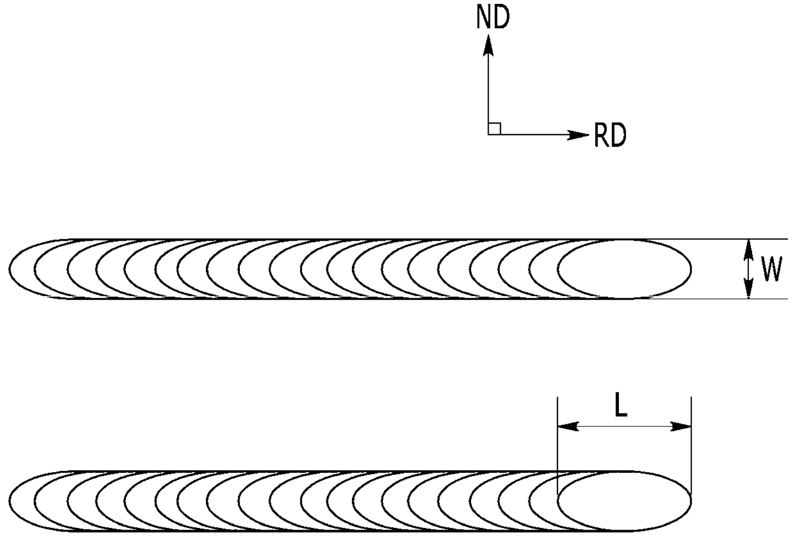
FIG. 6 is a schematic view illustrating a shape of a laser beam according to an exemplary embodiment of the present invention.

FIG. 6 illustrates a schematic view of a shape of a laser beam. In the forming of the groove, a beam length L of the laser in the rolling vertical direction (TD) of the steel sheet may be 50 to 750 μm. When the beam length L in the rolling vertical direction (TD) is too short, a time for which the laser is irradiated is too short, such that an appropriate groove may not be formed, and it is difficult to obtain the effect of reducing the iron loss. On the contrary, when the beam length L in the rolling vertical direction (TD) is too long, the time for which the laser is irradiated is too long, such that the groove 20 having a depth that is too large is formed, and it is difficult to obtain the effect of reducing the iron loss.

A beam width W of the laser in the rolling direction (RD) of the steel sheet may be 10 to 30 μm. When the beam width W is too long or short, a width of the groove 20 may be short or long, and an appropriate magnetic domain refining effect may not be obtained.

Although the beam having an elliptical shape is illustrated in FIG. 6, the shape of the beam is not limited to a shape such as a spherical shape or a rectangular shape.

As the laser, a laser having an output of 1 kW to 100 kW may be used, and a Gaussian mode laser, a single mode laser, or a fundamental Gaussian mode laser may be used. The laser may be a TEMoo type beam, and an M2 value may be in a range of 1.0 to 1.2.

Next, one surface or both surfaces of the grain-oriented electrical steel sheet 10 is irradiated with a laser in a direction intersecting with the rolling direction (RD) to form the thermal shock portion 30.

The forming of the groove 20 and the forming of the thermal shock portion 30 described above may be performed without limitation before and after the time. Specifically, after the forming of the groove 20, the thermal shock portion 30 may be formed. In addition, after the forming of the thermal shock portion 30, the groove 20 may be formed. In addition, the groove 20 and the thermal shock portion 30 may be simultaneously formed.

In the forming of the thermal shock portion 30, an energy density Ed of the laser may be 0.02 to 0.2 J/mm$^2$. When the energy density is too small, an appropriate thermal shock portion 30 is not formed, and it is difficult to obtain the effect of reducing the iron loss. On the contrary, when the energy density is too large, the surface of the steel sheet is damaged, such that it is difficult to obtain the effect of reducing the iron loss.

In the forming of the thermal shock portion 30, the beam length L of the laser in the rolling vertical direction (TD) of the steel sheet may be 1,000 to 15,000 μm, and the beam width W of the laser in the rolling direction (RD) of the steel sheet may be 80 to 300 μm.

Since the shapes of the groove 20 and the thermal shock portion 30 are the same as those described above, overlapping descriptions thereof will be omitted.

The method for refining a magnetic domain of a grain-oriented electrical steel sheet according to an exemplary embodiment of the present invention may further include forming an insulating coating film. After the preparing the grain-oriented electrical steel sheet, after the forming of the groove, or after the forming of the thermal shock portion, the forming of the insulating coating film may be included. More specifically, after the forming of the groove, the forming of the insulating coating film may be included. When the insulating coating film is formed after the forming of the groove, there is an advantage in that the insulation coating may be performed only once. After the forming of the insulating coating film, the forming of the thermal shock portion may be performed. Since the thermal shock portion does not cause damage to the insulating coating film, the damage to the insulating coating film is minimized, such that corrosion resistance may be maximized.

Any method of forming the insulating coating film may be used without particular limitation, and for example, the insulating coating film may be formed by a method of applying an insulating coating solution containing a phosphate. As such an insulating coating solution, it is preferable to use a coating solution containing colloidal silica and a metal phosphate. In this case, the metal phosphate may be Al phosphate, Mg phosphate, or a combination thereof, and a content of Al, Mg, or a combination thereof may be 15 wt % or more with respect to the weight of the insulating coating solution.

Hereinafter, the present invention will be described in more detail with reference to Examples. However, these Examples are only for illustrating the present invention, and the present invention is not limited thereto.

EXPERIMENTAL EXAMPLE 1: ANGLE BETWEEN GROOVE AND THERMAL SHOCK PORTION

A cold-rolled grain-oriented electrical steel sheet having a thickness of 0.30 mm was prepared. The electrical steel sheet was irradiated with a Gaussian mode continuous laser with 1.0 kW to form a groove at an angle of 86° to the RD. A width W of the laser beam was 20 μm, and a length L of the laser beam was 600 μm. An energy density of the laser was 1.5 J/mm$^2$, and a depth of the groove was 12 μm.

The grooves were formed in one surface of the steel sheet by controlling distances D1 between the grooves as shown in Table 1, and an insulating coating film was formed.

Thereafter, the electrical steel sheet was irradiated with a Gaussian mode continuous laser with 1.0 kW to form a thermal shock portion. A width W of the laser beam was 200 μm, and a length L of the laser beam was 10,000 μm. An energy density of the laser was 0.16 J/mm$^2$.

The thermal shock portions were formed by controlling distances D2 between the thermal shock portions as shown in Table 1. The angles θ formed with the grooves are summarized in Table 1. In addition, the surfaces of the thermal shock portion to be irradiated are summarized in Table 1 as one surface and the other surface.

The iron loss reduction rates and the magnetic flux density reduction rates are shown in Table 1. The iron loss reduction rate was calculated as $(W_1-W_2)/W_1$ by measuring an iron loss $W_1$ of the electrical steel sheet before irradiation with a laser and an iron loss $W_2$ of the electrical steel sheet after the formation of the thermal shock portion by irradiation with a laser. As for the iron loss, an iron loss value $W_{17/50}$ in a case where a frequency was 50 Hz when a magnetic flux density value was 1.7 Tesla was measured.

TABLE 1

| | Angle (θ, °) between groove and thermal shock portion | Distance between grooves (D1, mm) | Distance between thermal shock portions (D2, mm) | D2/D1 | Irradiated surface of thermal shock portion | Iron loss reduction rate (%) |
|---|---|---|---|---|---|---|
| Comparative Example 1 | — | — | — | — | — | 0 |
| Comparative Example 2 | — | 2.5 | — | — | — | 8.3 |
| Comparative Example 3 | — | — | 4.5 | — | — | 9.8 |
| Comparative Example 4 | 0 | 2.5 | 4.5 | 1.8 | The other surface | 9.9 |
| Example 1 | 1 | 2.5 | 4.5 | 1.8 | The other surface | 10.3 |
| Example 2 | 3 | 2.5 | 4.5 | 1.8 | The other surface | 10.9 |
| Example 3 | 5 | 2.5 | 4.5 | 1.8 | One surface | 10.2 |
| Comparative Example 5 | 8 | 2.5 | 4.5 | 1.8 | One surface | 8.4 |
| Comparative Example 6 | 0 | 2.5 | 5.0 | 2.0 | One surface | 9.7 |
| Example 4 | 1 | 2.5 | 5.0 | 2.0 | The other surface | 9.8 |
| Example 5 | 3 | 2.5 | 5.0 | 2.0 | The other surface | 10.0 |
| Example 6 | 5 | 2.5 | 5.0 | 2.0 | One surface | 9.8 |
| Comparative Example 7 | 8 | 2.5 | 5.0 | 2.0 | One surface | 9.1 |
| Comparative Example 8 | 0 | 2.5 | 5.5 | 2.2 | One surface | 9.8 |
| Example 7 | 1 | 2.5 | 5.5 | 2.2 | The other surface | 10.4 |
| Example 8 | 3 | 2.5 | 5.5 | 2.2 | The other surface | 11.2 |
| Example 9 | 5 | 2.5 | 5.5 | 2.2 | One surface | 10.8 |
| Comparative Example 9 | 8 | 2.5 | 5.5 | 2.2 | One surface | 9.9 |
| Comparative Example 10 | 0 | 3.0 | 6.0 | 2 | The other surface | 9.2 |
| Comparative Example 11 | 0 | 4.0 | 4.0 | 1 | The other surface | 8.5 |

As shown in Table 1, in the case where the angle between the groove and the thermal shock portion was appropriately controlled, it could be confirmed that the iron loss reduction rate was excellent. On the other hand, in the case where the groove and the thermal shock portion were formed in parallel or the angle therebetween was too large, it could be confirmed that the iron loss reduction rate was deteriorated.

In addition, among the Examples, in Examples in which D2/D1 was 1.8 or 2.2, the iron loss reduction rate was excellent in comparison to Examples in which D2/D1 was 2.0.

In addition, among the Examples, in Examples in which the thermal shock portion was formed in the other surface, the iron loss reduction rate was excellent in comparison to Examples in which the thermal shock portion was formed in one surface.

The present invention is not limited to the exemplary embodiments, but may be manufactured in various different forms, and it will be apparent to those skilled in the art to which the present invention pertains that various modifications and alterations may be made without departing from the spirit or essential feature of the present invention. Therefore, it is to be understood that the exemplary embodiments described hereinabove are illustrative rather than being restrictive in all aspects.

| [Detailed Description of Main Elements] | |
|---|---|
| 10: grain-oriented electrical steel sheet, | |
| 11: one surface of steel sheet, | |
| 12: the other surface of steel sheet, | 20: groove, |
| 21: imaginary groove, | 30: thermal shock portion, |
| 40: solidified alloy layer, | 50: insulating coating film |

The invention claimed is:

1. A grain-oriented electrical steel sheet comprising:

a linear groove formed in one or both surfaces of the electrical steel sheet in a direction intersecting with a rolling direction; and a linear thermal shock portion formed in the one or both surfaces of the electrical steel sheet in a direction intersecting with the rolling direction, wherein an angle between a longitudinal direction of the groove and a longitudinal direction of the thermal shock portion is 1 to 5°, and wherein the groove and the thermal shock portion do not intersect with each other.

2. The grain-oriented electrical steel sheet of claim 1, wherein:

a plurality of grooves and a plurality of thermal shock portions are formed in the rolling direction, and a ratio D2/D1 of a distance D2 between the thermal shock portions to a distance D1 of a distance between the grooves is 1.7 to 2.3.

3. The grain-oriented electrical steel sheet of claim 2, wherein:

the ratio D2/D1 of the distance D2 between the thermal shock portions to the distance D1 between the grooves is 1.7 to 1.9 or 2.1 to 2.3.

4. The grain-oriented electrical steel sheet of claim 1, wherein:

a distance D1 between the grooves is 2.0 to 3.0 mm, and a distance D2 between the thermal shock portions is 4.0 to 6.0 mm.

5. The grain-oriented electrical steel sheet of claim 1, wherein:

the groove and the thermal shock portion are formed in one surface of the steel sheet.

6. The grain-oriented electrical steel sheet of claim 1, wherein:

the groove is formed in one surface of the steel sheet, and the thermal shock portion is formed in the other surface of the steel sheet.

7. The grain-oriented electrical steel sheet of claim 1, wherein:

a depth of the groove is 3 to 5% of a thickness of the steel sheet.

8. The grain-oriented electrical steel sheet of claim 1, wherein:

a difference in Vickers hardness Hv between the thermal shock portion and a surface of the steel sheet in which the thermal shock portion is not formed is 10 to 120.

9. The grain-oriented electrical steel sheet of claim 1, further comprising:

a solidified alloy layer formed at a bottom of the groove, wherein a thickness of the solidified alloy layer is 0.1 μm to 3 μm.

10. The grain-oriented electrical steel sheet of claim 1, further comprising:

an insulating coating film formed on an upper portion of the groove.

11. The grain-oriented electrical steel sheet of claim 1, wherein:

each of the longitudinal directions of the groove and the thermal shock portion and the rolling direction forms an angle of 75 to 88°.

12. The grain-oriented electrical steel sheet of claim 1, wherein:

two to ten grooves or thermal shock portions are intermittently formed in a rolling vertical direction of the steel sheet.

* * * * *